United States Patent [19]
Sherno

[11] Patent Number: 6,142,542
[45] Date of Patent: Nov. 7, 2000

[54] COLLISION IMPACT ABSORBER

[76] Inventor: Stanley A. Sherno, 67 Rocky Mountain Dr. S., Effort, Pa. 18330

[21] Appl. No.: 09/268,439

[22] Filed: Mar. 12, 1999

[51] Int. Cl.[7] .................................................. B60R 19/26
[52] U.S. Cl. .......................... 293/132; 293/102; 293/155
[58] Field of Search .................................. 293/102, 132, 293/155, 1

[56] References Cited

U.S. PATENT DOCUMENTS

| | | |
|---|---|---|
| 1,177,340 | 3/1916 | Klein . |
| 1,684,776 | 9/1928 | Nishida et al. . |
| 1,718,658 | 6/1929 | Matsumoto . |
| 2,843,224 | 7/1958 | Landman et al. ...................... 293/132 |
| 2,959,251 | 11/1960 | Landman et al. ...................... 293/132 |
| 2,966,225 | 12/1960 | Carroll . |
| 3,056,462 | 10/1962 | Graham . |
| 3,349,865 | 10/1967 | Deutsch . |
| 3,383,077 | 5/1968 | Noviello, Jr. . |
| 3,472,332 | 10/1969 | Halvajian . |
| 3,495,676 | 2/1970 | Graham . |
| 3,618,693 | 11/1971 | Graham . |
| 3,806,184 | 4/1974 | Dean . |
| 3,822,907 | 7/1974 | Appel et al. . |
| 4,065,169 | 12/1977 | Yamanaka . |
| 4,143,735 | 3/1979 | Schlanger . |
| 4,372,595 | 2/1983 | Roberts ................................... 293/132 |
| 4,410,208 | 10/1983 | Mulso, Jr. et al. ..................... 293/132 |
| 4,514,002 | 4/1985 | McIntosh ................................ 293/155 |
| 4,566,555 | 1/1986 | Schlanger . |
| 4,582,351 | 4/1986 | Edwards ................................. 293/102 |
| 4,826,209 | 5/1989 | Farris . |
| 5,226,685 | 7/1993 | Chen . |
| 5,257,842 | 11/1993 | Sherno . |
| 5,507,546 | 4/1996 | Holley ................................... 293/102 |
| 5,520,428 | 5/1996 | Bell ....................................... 293/102 |
| 5,799,976 | 9/1998 | Tischer ................................. 293/102 |
| 6,056,337 | 5/2000 | Oguri et al. .......................... 293/132 |

FOREIGN PATENT DOCUMENTS 592295  9/1947  United Kingdom .

*Primary Examiner*—Joseph D. Pape
*Assistant Examiner*—Kiran Patel
*Attorney, Agent, or Firm*—Charles A. Wilkinson

[57] ABSTRACT

An improved collision impact absorber for mounting upon a vehicle is formed of an elongated structural member both pivotally and longitudinally movable with respect to the vehicle. Impact force upon the outer end of the structural member is initially absorbed by longitudinal deflection of the structural member, and further absorbed by the rotation of the structural member with respect to the vehicle. The rotation of the structural member with respect to the vehicle transfers and dissipates the impact force into a reactive lifting of the vehicle, the weight of the vehicle acting as a resistant force to the lifting of the vehicle. A catch, or detent, allows the elongated structural member to longitudinally move or deflect a certain, predetermined distance prior to initiating rotation of the member about a pivot point. This prevents rotation of the elongated structural member until after such elongated structural member has undergone a certain predetermined deflection, which translates into a predetermined amount of impact force to initiate dissipation of force by lifting of the vehicle body.

20 Claims, 6 Drawing Sheets

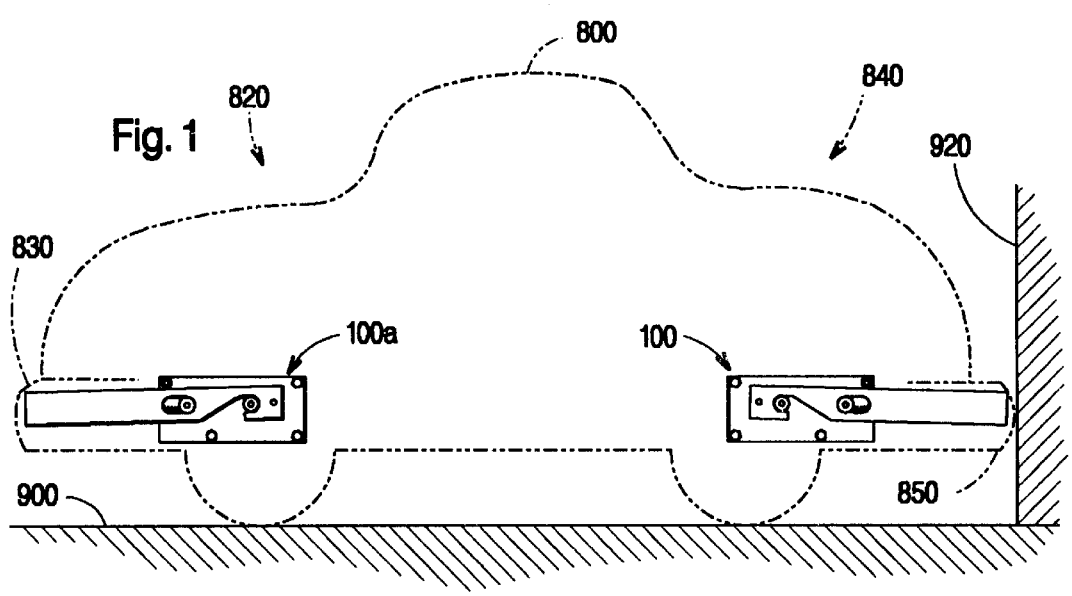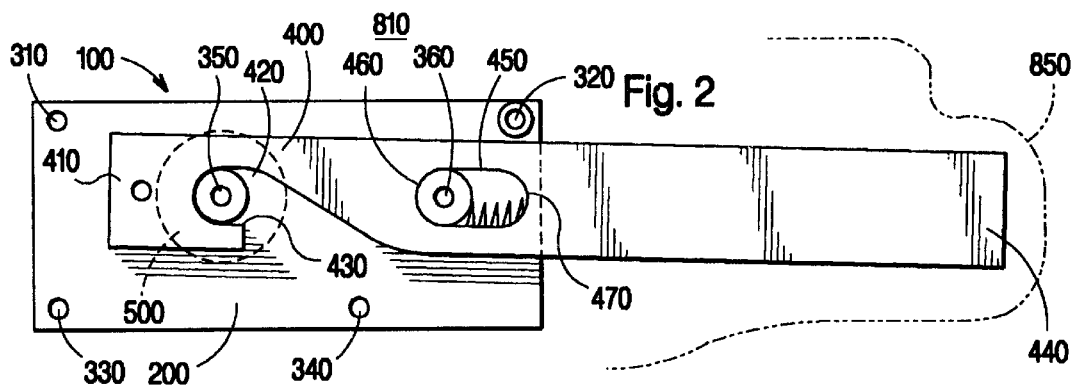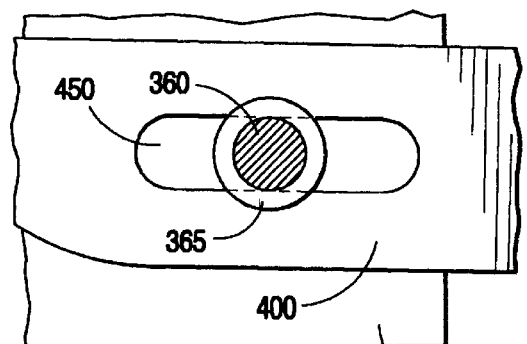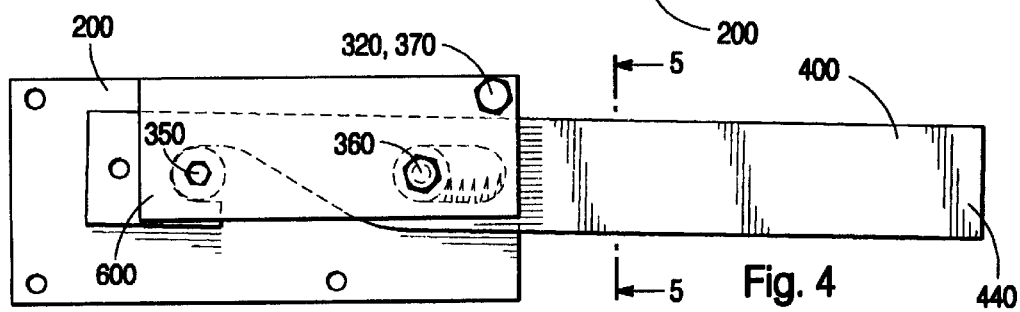

COLLISION IMPACT ABSORBER

BACKGROUND OF THE INVENTION

1. FIELD OF THE INVENTION

This invention relates to a collision safety device for vehicles, and more particularly, to an improved vehicle impact collision absorber that transforms an impact force upon a vehicle body into a lifting of the vehicle body, which lifting force is absorbed by the weight, or normal force, of the vehicle body. The force required to lift a vehicle body and the vehicle's reactive normal force or weight coact to dissipate the impact force by diverting the collision impact energy to the raising of the vehicle, thereby reducing the likelihood of damage to the vehicle and its occupants.

2. PRELIMINARY DISCUSSION

An impact upon an automotive vehicle can be quite traumatic, both to the occupants and the vehicle's structural integrity.

Low speed impacts, in the nature of impacts occurring at from 0 to 20 miles per hour, tend to result in less damage all around.

Even at a relatively low speeds, however, such as between 5 and 15 miles per hour, the amount of damage to a bumper or the like can be quite extensive.

Impact absorbers today, i.e. bumpers, impact bars and the like, regardless of where they might be positioned, are designed to withstand a minimal impact collision in the range of 0 to 5 miles per hour without noticeable or serious structural deformation. Low to mid speed collisions usually result in additional structural damage to a vehicle frame, and with the current use of so-called "crumple zones," such damage can be considerable. It is known that the greater the impact force absorbed by the vehicle body and frame, the less impact force will be experienced by the occupants. "Crumple zones" and the like are wonderful at dissipating force, however, a relatively minor impact can result in a very expensive repair, particularly if such impact causes a disproportionate amount of the vehicle body or frame to "crumple." While vehicles simply aren't built the way they used to, i.e. with steel ship-like hulls, one of their primary purposes is to protect the passengers from any type of impact, whether it be a simple rock ejected from the wheel of a tractor trailer, or whether it be a jack-knifed tractor trailer skidding down a roadway. Consequently, any device that improves the chances of reduced harm to vehicle and passengers during an impact situation should be looked favorably upon by all.

Impact force absorption generally occurs in one of three ways. First, as demonstrated by dented bumpers, bent frames or progressively crumpling "crumple zones," an impact force can be absorbed through the mechanical, structural deformation of the body being impacted. This type of impact absorption is usually the most expensive and aesthetically unappealing. Another type of impact absorption is absorption into the opposite body, i.e. a strong rigid bumper may transfer a considerable amount of the impact into another body, damaging that body. If the other body is "immovable," such as a tree, wall, telephone pole or the like, however, the sudden stop may impair the occupants of the vehicle. A third type of impact force absorption occurs through the transformation or transferral of such impact force to a force "sink," or away from the body being impacted.

The transferral or bypassing of energy to avoid or prevent contact with a particular object is known throughout the scientific world. A lightning rod is a prime example of this concept, where the rod transfers a high-magnitude burst of electrical energy through a house to the "ground," with the ground serving as an energy sink. Lightning rods are used primarily to protect the occupants and electrical system of a dwelling, since a direct impact upon a house without an energy transfer means would wreak havoc on any electrical appliance, the wiring system in general, and potentially the occupants of the dwelling.

The device of the present invention operates under a similar energy transfer theory, although the focus is on the transfer of moving mechanical, or kinetic energy, not electrical energy. Kinetic energy generated during a vehicle impact is usually transmitted both into the impacted vehicle and back into the impacting vehicle or other object impacted. Energy imparted to the impacted vehicle generally tends to cause such vehicle to either move in a direction directly opposite the impacting force, or in an oblique direction, i.e. upward, downward or to the side, or a mixture of all three. A downwardly directed impact force tends to be partially transmitted through the vehicle and into the ground, where the ground enhances the dissipation of the force. Since the ground is relatively immovable, however, considerable reactive forces return to the vehicle.

An upwardly directed impact force, however, tends to cause the vehicle to lift, which is overall more difficult to achieve due to the normal force or weight of the vehicle acting opposite the lifting force. In other words, due to the gravitational pull of the earth upon a vehicle, i.e. its weight, it is much more difficult to lift a portion of a vehicle than it is to cause the vehicle to move downwardly or even to the side. Consequently, it takes considerable more energy to cause a vehicle to move in an upward direction than in a downward direction.

The present inventor applied this principle to vehicle impact situations, and designed a device that would transfer an impact force into a lifting force, with such lifting force being dissipated rather quickly due to its interaction with the weight forces of a vehicle. The broad concept of a vehicle absorption device that transforms impact energy into lifting energy is, however, quite old. Early designs illustrate, for example, the direct transformation of a horizontal impact energy upon a bumper or the like directly to the ground through a separate and distinct mechanical linkage. Other devices illustrate means to transform an impact energy into a lifting motion that create both a braking force and a dissipating force with respect to the impacted automobile. Both safety considerations and energy transformation issues have led to the establishment of a well developed class of art in the files of the U.S. Patent and Trademark Office, which class of art is generally directed to or demonstrative of a collective desire to overcome several particular problems using consistent or similar methods or means, one of which problem is the dissipation of collision energy by using such energy to raise one of the impacted or vehicles.

It can not be overlooked, however, that while the Patent Office files include a large number of references designed to absorb collision impacts in the same general manner as the present inventor, none of such references appear to have experienced significant and/or lasting commercial success.

3. DESCRIPTION OF RELATED ART

As noted above, the prior art related to impact absorption systems is relatively well developed, with some of the more relevant references dealing with angled energy transfer systems listed below:

| U.S. Patents | | |
|---|---|---|
| Number | Inventor | Issue Date |
| 1,177,340 | J. B. Klein | 03-28-1916 |
| 1,684,776 | S. Nishida et al | 09-18-1928 |
| 1,718,658 | K. Matsumoto | 06-25-1929 |
| 2,966,225 | F. M. Carroll | 12-27-1960 |
| 3,056,462 | P. Graham | 10-02-1962 |
| 3,495,676 | P. Graham | 02-17-1970 |
| 3,618,693 | P. Graham | 11-09-1971 |
| 3,349,865 | A. T. Deutsch | 10-31-1967 |
| 3,383,077 | N. Noviello, Jr | 05-14-1968 |
| 3,472,332 | E. M. Halvajian | 10-14-1969 |
| 3,806,184 | J. O. Dean | 04-23-1974 |
| 3,822,907 | H. Appel et al | 07-09-1974 |
| 4,065,169 | A. Yamanaka | 12-27-1977 |
| 4,143,735 | S. L. Schlanger | 03-13-1979 |
| 4,566,555 | S. L. Schlanger | 01-28-1986 |
| 4,826,209 | E. T. Farris | 05-02-1989 |
| 5,226,685 | Y. Chen | 07-13-1993 |
| 5,507,546 | J. D. Holley | 04-16-1996 |
| 5,570,826 | L. V. Garbes et al | 11-05-1996 |
| 5,697,467 | M. S. Howard | 12-16-1997 |

Absent from the above is the present inventor's original design, embodied in his initial U.S. Pat. 5,257,842, issued to S. Sherno on Nov. 2, 1993, entitled "Collision Impact Absorber." The original design consisted of a pivoted lever attached to the frame of an automobile, such that in a collision, such lever receives a direct impact resulting in a downward force upon the lever arm, and a reactive upward force upon the vehicle, the rotation of the arm being restrained somewhat by a spring attached between the lever arm and the vehicle. The pivot connection is located at the end of the arm, while the spring or recoil is situated between the impact and the pivot point. At rest, the lever arm is mounted with a downward inclination or angle from horizontal, such that a horizontal force upon the end of the lever arm is immediately translated into a clockwise rotation at the pivot point of the lever, which clockwise rotation results in upward movement of the vehicle. There is also provided a stop which maintains the lever arm at a fixed angle to horizontal when at rest.

The original Sherno design was ingenious because it was so simple. The prior art is teeming with designs that are quite and even incredibly complicated, and therefore, difficult to implement without a radical change or substantial additions to a vehicle structure. The original Sherno design utilized a single force transmission member, which created a direct transfer of an impact force into a lifting force. Other inventions required complicated linkage systems, with at least two, three or more force transmissions between the point of impact and the lift upon the vehicle.

The original Sherno design is, however, not without its shortcomings. The placement of the original lever arm resulted in its immediate rotation upon impact, which caused the vehicle to deflect even under the most minimal of impact conditions, i.e. at less than 5 miles per hour for example. Furthermore, the impact end of the lever arm is situated below and/or in front of the bumper, which can appear somewhat unsightly and out of place. It would be more desirable, for example, to have the impact end of the collision absorber located before or behind the bumper, or even integrally attached to a bumper, which placement would enhance the function of the original bumper, and at the same time hide the lever arm from view. Locating the lever arm at or below the bumper also results in an increased angle of the lever arm to the horizontal at rest, which is one of the reasons why the original lever arm initiated immediate rotation upon impact.

Another shortcoming of the original Sherno design, as discussed briefly above, is its inability to undergo a minimal impact without immediately imparting a rotation to the impacted body. In relatively low speed impacts, it would be desirable if there was some way to prevent an immediate rotation of the lever arm, where such rotation would be deemed ineffective or plainly unnecessary. Furthermore, in relatively low speed impacts, it would also be desirable, for example, to have the lever arm deflect rearward, or away from the impacting force, a certain distance prior to initiating rotation, where such rearward deflection would be controlled by a deflection means related to the amount of force imparted to the end of the collision absorber and further related to the length of the lever arm. In other words, it would be desirable if the lever arm were equipped with some means that allowed it to deflect a certain amount for a predetermined amount of force in order to absorb and dissipate a limited amount of force or energy, but after attaining such limited force, such lever arm would initiate rotation with respect to a vehicle body and cause such vehicle to lift as before, effectively absorbing additional energy. Such predetermined amount of force mentioned above might be related to the structural properties of the deflection means, coupled with the force properties of the impacting body, and it might also be desirable to have such structural properties of such deflection means variable, particularly if the collision absorber is going to be incorporated into different vehicles or the like, having different weights, etc.

The original Sherno design, therefore, suffers from several structural shortcomings, none of which have been addressed by the prior art before or since. In fact, the prior art issued subsequent to the original Sherno patent, as known by the inventor, has failed to present a collision impact absorber having any of the properties of the original Sherno design, or a collision impact absorber that improves upon such design. There exists a need, therefore, to provide an improved collision impact absorber having all of the desirable improvements or features mentioned above.

OBJECTS OF THE INVENTION

It is an object of the present invention, therefore, to provide an improved collision impact absorber that transforms an impact force upon an impacted object into a lifting force upon such object, which lifting force upon such objects acts to assist in dissipating the impact force upon such object.

It is a further object of the present invention to provide an improved collision impact absorber that transforms an impact force upon an impacted object into a lifting force upon such object, but only after a predetermined amount of impact force has been experienced by such impacted object.

It is a still further object of the present invention to provide an improved collision impact absorber that transforms an impact force upon an impacted object into a lifting force upon such object via an elongated structural member pivotally connected between the impact force and the impacted object.

It is a still further object of the present invention to provide an improved collision impact absorber that transforms an impact force upon an impacted object into a lifting force upon such object via an elongated structural member that is both pivotally connected between the impact force and the impacted object and longitudinally movable in response to such impact force.

It is a still further object of the present invention to provide an improved collision impact absorber that transforms an impact force upon an impacted object into a lifting force upon such object via a rotatably movable, elongated structural member pivotally connected between the impact force and the impacted object, where such rotation occurs after a longitudinal movement of the structural member in response to such impact force.

It is a still further object of the present invention to provide an improved collision impact absorber that transforms an impact force upon an impacted object into a lifting force upon such object via an elongated structural member that is longitudinally and rotatably movable within certain predefined ranges of movement.

It is a still further object of the present invention to provide an improved collision impact absorber that transforms an impact force upon an impacted object into a lifting force upon such object via an elongated structural member that comprises longitudinal movement either independently of or in conjunction with its rotational movement.

It is a still further object of the present invention to provide an improved collision impact absorber including means to temporarily or initially restrict or prevent the rotational and/or longitudinal movement of the elongated structural member.

It is a still further object of the present invention to provide an improved collision impact absorber including means to maintain such longitudinally extended member at a fixed position at rest.

It is a still further object of the present invention to provide an improved collision impact absorber that transforms an impact force upon an impacted object into a lifting force upon such object via an elongated structural member maintained at rest at a very slight angle to the horizontal.

It is a still further object of the present invention to provide an improved collision impact absorber that transforms an impact force upon an impacted object into a lifting force upon such object via an elongated structural member maintained at rest in a generally horizontal position.

It is a still further object of the present invention to provide an improved collision impact absorber that is mounted to a vehicle between the frame of such vehicle and an outer surface of such vehicle.

It is a still further object of the present invention to provide an improved collision impact absorber that is mounted upon a vehicle between the frame of such vehicle and an outer bumper of such vehicle.

It is a still further object of the present invention to provide an improved collision impact absorber that is mounted upon a vehicle between the frame of such vehicle and extending beyond the outer surface of such vehicle.

Still other objects and advantages of the invention will become clear upon review of the following detailed description in conjunction with the appended drawings.

SUMMARY OF THE INVENTION

The improved collision impact absorber of the present invention comprises a mounting plate or other mounting means adapted for attachment to a vehicle body, an elongated structural member pivotally and longitudinally movable upon such mounting plate or means and extending between the mounting plate location and a position closer to the exterior surface of the vehicle, such as behind or adjacent to a bumper surface or the like. A catch arrangement maintains the elongated structural member in a position fixed with respect to the vehicle body at rest prior to an impact force. An impact force upon the impact end of the elongated structural member causes such structural member to longitudinally deflect or more a certain, predetermined distance prior to initiating rotation of such elongated structural member about a pivot point. The catch assembly prevents rotation of the elongated structural member about the pivot point until after the elongated structural member has undergone a certain predetermined longitudinal deflection or movement. The catch assembly of the invention also enables positioning of the elongated structural member at a very slight angle to the horizontal, or even at horizontal thereto as the case may be, particularly if other means are provided to initiate rotation of the elongated structural member in response to an impact force at or adjacent the end. Furthermore, means are provided to limit the longitudinal deflection and/or rotation of the elongated structural member about its pivot point.

The longitudinal deflection resulting from an initial impact upon the elongated structural member does not result in an immediate transformation of the impact force into a lifting force upon the vehicle, but instead results in the impact force being absorbed by a subsidiary longitudinal deflection means incorporated into or associated with the principal elongated structural member. Once the longitudinal deflection has reached a certain predetermined degree or distance, the elongated structural member initiates or begins a rotation about a fixed pivot point, which causes the transformation of the impact force into a lifting force upon the vehicle. Rotation of the elongated structural member about a point fixed to the vehicle body is opposed by a reactive force, i.e. the weight of the vehicle which opposes lifting of the body, which in turns acts to absorb and/or dissipate the impact force as discussed above.

BRIEF DESCRIPTION OF THE DRAWINGS

FIG. 1 is a schematic side view of a vehicle equipped with the improved collision impact absorber at the front and rear ends of such vehicle.

FIG. 2 is a side view of the improved collision impact absorber of the invention shown in a latched or rest position.

FIG. 3 is a side view of the slot portion of the improved collision impact absorber of the invention showing a possible retention member.

FIG. 4 is a side view of the improved collision impact absorber of the invention shown in a latched or rest position with a further plate attached thereto.

DESCRIPTION OF THE PREFERRED EMBODIMENTS

Figure 5:
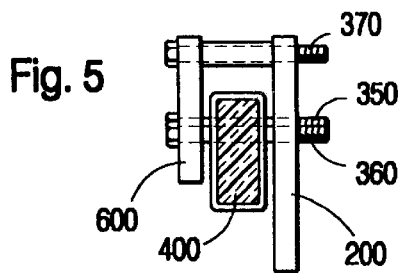
FIG. 5 is an edge view of the improved collision impact absorber of the invention of FIG. 4.

The collision impact absorber of the device of the present invention is an improved version of the original device embodied in U.S. Pat. No. 5,257,842. More specifically, it provides a means for energy transformation of an impact force into a lifting force through energy absorption of a minor impact upon the device. Even more specifically, the device of the instant invention absorbs an initial impact within an elongated structural arm, but does not immediately translate an impact force into a rotation of the structural arm and a reactive lifting of the vehicle body. With minor impacts, it becomes advantageous to have the initial force absorbed directly into the collision impact absorber, which reduces the need to have the vehicle body undergo an unnecessary lift, which could potentially damage the vehicle body or frame or the occupants of the vehicle. Furthermore, by lifting one set of wheels of the vehicle from the ground, or at least relieving significant weight from such wheels, such action could possibly result in an uncontrolled horizontal direction change of such vehicle, particularly if the impact is at an oblique angle. As the impact becomes greater, however, when such impact might probably cause the wheels of the vehicle to skid across the ground in any event, the additional impact force is translated into a lifting motion, which harmlessly absorbs energy that might otherwise result in the crumpling of a vehicle structure.

The instant invention is also superior to the previous design in its ability to effectively lock the force transferring arm in place prior to a major impact. A minor impact will be absorbed into the structural arm itself or into an integral energy absorption means, but such impact will not generally tend to cause the structural arm to "unlock" and initiate a lifting maneuver upon the vehicle. Consequently, only after the initial impact has been absorbed by the device of the present invention, will such device transform the impact force into a lifting force upon the vehicle.

The instant invention is also superior to the previous design in its ability to experience an impact force upon the structural arm at a much slighter angle to the horizontal than its predecessor. The prior design had the end of the pivot arm situated below the bumper axis at a somewhat severe angle, resulting in an immediate rotation of the arm about its pivot point and absolutely no initial absorption of the impact force into the pivot arm itself. The structural changes included in the improved design enables the pivot arm to be almost horizontal, which frees up the placement possibilities with respect to the vehicle bumpers and any other location upon the vehicle. In other words, placement of the device of the present invention within, behind or integral with a bumper is now possible, preferable and operationally extremely favorable, and this makes the design of the present invention also that much more aesthetically appealing. With today's bumpers moving closer to the frame of the vehicle, almost to the point where the bumpers blend into the frame, it becomes increasingly important to have a finished look about the vehicle.

It would be less than preferable to have a possibly unsightly device extending from below a bumper, as with the earlier design, not to mention the potential road hazards inherent with such placement. It would also be most unfortunate if the safety device of the previous design was destroyed or rendered inoperative due to upwardly extending road conditions, such as debris, potholes or the like, not to mention potential problems with parking against concrete barriers that have ruined or marred many a license plate or spoiler section. It would be undesirable, for example, to have a safety device impact a curb during straight-in parking with the device of the earlier or basic invention thereby deploying and lifting the vehicle up and over the curb. The improved device of the present invention overcomes these potential problems through an improved design that allows the structural arm to be mounted adjacent to, or integral with the bumper, not below the bumper.

Having the longitudinal axis of the structural arm of the present invention in its initial or rest position situated closer to the horizontal also better provides for the ability to initiate longitudinal movement upon experiencing a generally horizontal impact force. The initial longitudinal movement of the structural arm, in conjunction with a means to resist such longitudinal movement, absorbs an initial impact force in the generally horizontal, longitudinal direction. The slight angle to the horizontal also prevents an undue amount of rotational stress upon the device of the prevent invention during the initial longitudinal deflection.

In fact, the device of the present invention can even be situated with the longitudinal axis of the structural arm positioned along the horizontal, provided there are means to transfer or translate the generally horizontal impact force upon the structural arm into a lifting of a portion of the vehicle. In other words, once the structural arm deflects longitudinally, there needs to be a way to initiate rotatable movement of the arm, so as to create a reactive lifting of the vehicle under moderate to severe impact conditions. Means to initiate rotation of the structural arm is preferably separate from the structural arm, in order to maintain the desirable feature of having the force transmission occur through only one member, such means being discussed in detail herein.

The following detailed description is of the best mode or modes of the invention presently contemplated. Such description is not intended to be understood in a limiting sense, but to be an example or examples of the invention presented solely for illustration thereof, and by reference to which in connection with the following description and the accompanying drawings one skilled in the art may be advised of the advantages and construction of the invention.

FIG. 1 is a schematic side view of the improved collision impact absorber of the present invention 100 mounted to or upon a vehicle 800, shown in phantom. While the vehicle shown in FIG. 1 resembles an automobile, or a car, it will be understood that any vehicle may be equipped with the device of the present invention, whether it be a truck, motor home, snow mobile, tractor or the like, basically anything that moves, regardless of whether it is natural fuel powered, foot powered or the like. The vehicle 800 is shown positioned on a planar surface 900, which will be designated generally as the ground, and is facing an impacting surface 920, which will be designated generally as a wall. While the impacting surface 920 will, for purposes of explanation, will designated as a wall, it will be understand that such impacting surface 920 could also comprise another vehicle, tree, telephone pole, or almost any other object stationary or movable having a significant inertia either in itself or through association with another object. The vehicle 800 generally comprises a rear section 820 and a front section 840, with each section having a bumper 830 and 850 respectively. It will be understood that different vehicles will have different bumper arrangements, particularly where bumpers may be situated in unconventional locations. However, for purposes of explanation, the vehicle designated herein will only have front and rear bumper assemblies. It will also be understood that while the improved impact absorber of the present invention 100 is shown associated with the front bumper 850 of the vehicle 800, it can also be associated with the rear bumper 830 of the vehicle, as shown in FIG. 1 as 100a, or at any location along a vehicle where an impact might occur, even at locations where bumpers are not normally present. The details of the improved device of the invention will now be discussed.

FIG. 2 is a side view of the improved collision impact absorber of the present invention comprising a mounting plate 200 adapted for attachment to a vehicle frame 810 via attachment means designated 300 generally, or more specifically, 310, 320, 330 and 340 as shown. Attachment means 300 may consist of threaded fastenings such as bolts secured to the frame 810, or other suitable fasteners of suitable strength to affix the plate 200 to the frame. An elongated structural member 400 has one end 410 temporarily fixed in place by a catch arrangement, designated generally by a dotted circle as reference numeral 500 and more specifically by a support rod or pin 350, which is welded or fixed to the mounting plate 200, such support rod 350 being in FIG. 2 seated within a hook shaped slot 420 of the elongated structural member 400 and/or on surface 430 situated within such hook shaped slot 420. The opposite end 440 of the elongated structural member 400 is positioned adjacent to, or fastened against one of the vehicle bumpers, here the front bumper 850. The elongated structural member 400 also has a slot 450 having a first end or edge 460 and a second end or edge 470, in which is located a pivot rod or shaft 360, which is welded or fixed to the mounting plate 200.

The elongated structural arm 400 is shown in FIG. 2 and some of the following figures with its longitudinal axis at an angle to the horizontal, albeit a slight angle. For purposes of illustration, the angle to the horizontal will appear somewhat exaggerated to illustrate that it is in fact positioned at an angle. However, it will be understood that the angle can be very slight, i.e. only a couple of degrees, and as will be seen, almost non-existent, and the present invention is not meant to be limited to any particular angle shown in the drawings or otherwise. It is preferred, however, to have the angle of the longitudinal axis of the elongated structural arm at between five and fifteen degrees from the horizontal, although the ultimate range of operation is by no means limited to between five and fifteen degrees to the horizontal.

The elongated structural arm 400 is shown in FIG. 2 and some of the following figures is also shown in the form of a generally rectangular tubular structure. It will be understood, however, that the cross section of the structural arm 400 can assume any shape, i.e. circular, square or the like, as long as the structural arm 400 is strong enough to withstand both a longitudinal impact force and a rotational force about a pivot point.

As shown in FIG. 3, which is a close-up view of the slot section 450, the elongated structural arm 400 may be movably secured to the mounting plate 200 by way of the pivot rod 360 using a mounting or securing means having an enlarged head 365, such as an enlarged bolt head, or even an additional washer-type piece or the like. The elongated structural arm 400 is movable by way of the rod 360 sliding within the slot 450, and the enlarged section 365 keeps the arm 400 from disengaging with the slot 450. An alternative, yet preferable, way to secure the arm 400 to the plate 200, as shown in FIG. 4, which is a side view of the improved collision impact absorber of the present invention, is through the use of a further plate 600 attached to the mounting plate 200 via previously defined support rods 350, 360 and an additional support rod 370 connected between the two plates 600 and 200, but not the arm 400 as with the support rod 360 and temporarily with the support rod 350. The plate 600 serves a similar function as the enlarged member 365 shown in FIG. 3, and support rod 370 also serves an additional function, which will be described in detail in connection with FIG. 12. FIG. 5, which is an edge view of the assembly of FIG. 4 from the end 440 of the arm 400, illustrates the rod connections 350, 360 and 370 between the plate 200, the arm 400 and the plate 600, and illustrates how the rod 370 does not connect the plates 200 and 600 through the elongated structural arm 400.

Figure 6:
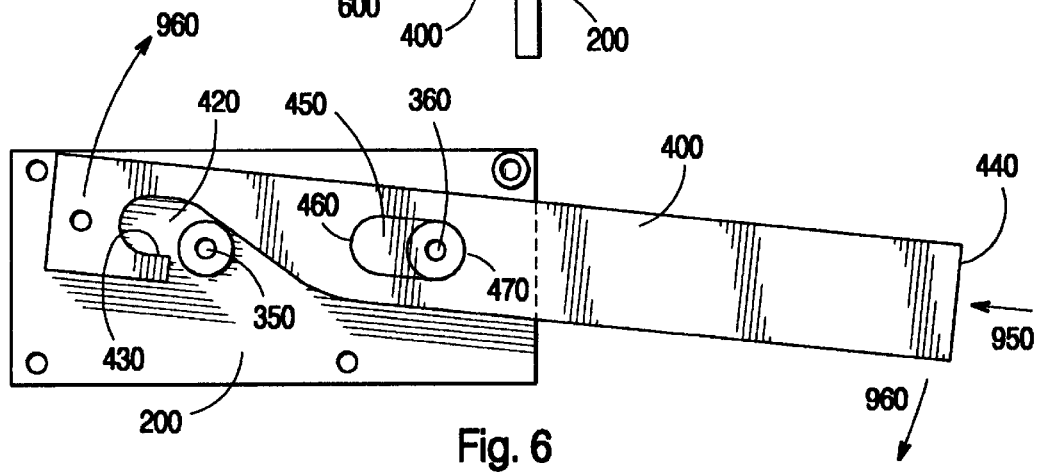
FIG. 6 is a side view of the improved collision impact absorber of the invention shown in an unlatched position under the influence of an external impact force.

Movement of the elongated structural arm of the device of the present invention occurs generally in two discrete stages. First, as illustrated in FIG. 6, an impact force designated by arrow 950, transmitting initially through an exterior surface of a vehicle, i.e. a bumper or the like, would bear upon the elongated structural member 400 at its impact end 440. This impact force 950 causes the structural member 400 to deflect or move longitudinally via a relocation of the support rods 350 and 360 within their respective slots 420 and 450. Thus, a longitudinal deflection of the structural member 400 causes the structural member to move from a first position, shown generally in FIG. 2 with the support rod 360 bearing against or adjacent the side 460 or end of the slot 450 and the support rod 350 seated within the hook shaped slot 420, to a second position, shown generally in FIG. 6 with the support rod now bearing against or adjacent the side or end 470 of the slot 450 and the support rod 350 released from the surface 430 and the hook shaped slot 420. In effect, the hook shaped slot 420 and slot 450 allow and provide for longitudinal movement of the structural arm 400, with the hook shaped slot 420 also initially preventing rotation of the structural arm 400 about the support rod 360.

Figure 7:
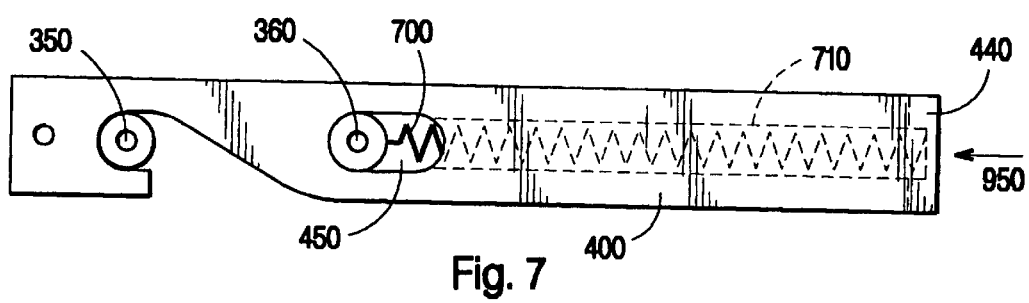
FIG. 7 is a side view of the elongated structural member of the invention shown with resilient opposing means positioned between the support rod and the impact end thereof.
Figure 8:
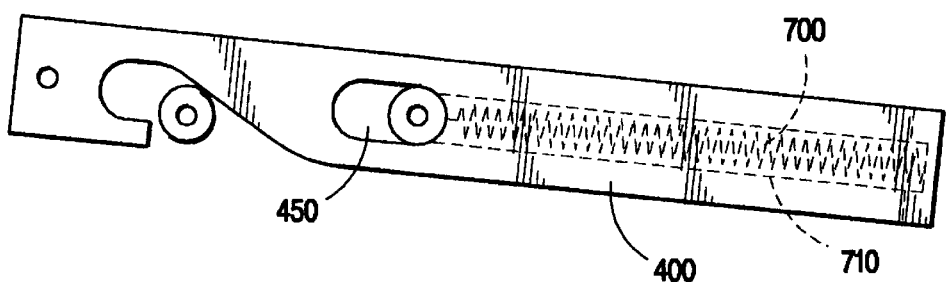
FIGS. 8–11 are side views of the elongated structural member of the invention shown with alternative forms of opposing means to that of FIG. 7.
Figure 9:
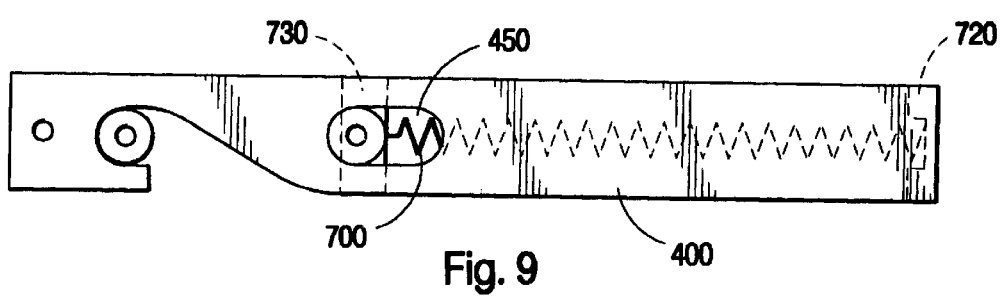
Figure 10:
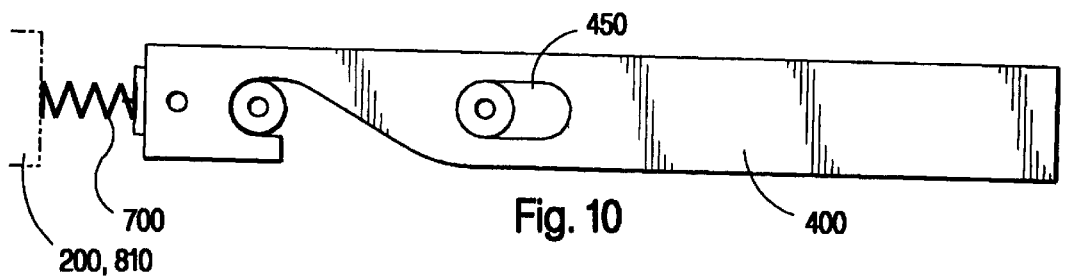

The longitudinal deflection of the structural arm 400 is also accompanied by an initial force absorption due to a means opposing longitudinal movement of the structural arm. Such opposing means is preferably in the form of a resilient opposing means, such as a spring or the like. FIG. 7, which is a side view of just the structural member 400 and the support rods 350 and 360, illustrates a resilient spring means 700 connected between the impact end 440 of the structural member 400 and the support rod 360. An impact force 950 upon the impact end 400 causes the spring means 700 to compress against the support 360, see FIG. 8, which tends to inhibit or oppose the longitudinal deflection of the member 400, with the compression of the spring absorbing a portion of the impact force 950. The spring means 700 may be fastened between the impact end 440 and the support rod 360 either loosely, securely, i.e. the spring 700 may be either directly fastened to the support rod 360 and the impact end 440, or may be loosely contained or supported within a support structure such as a tube 710. FIG. 9 illustrates an alternative, yet preferred, support structure for the spring 700, consisting of a pair of internal plugs 720 and 730 that house the ends of the spring 700, where plug 730, and not the actual spring end, would bear directly upon the support rod 360. Of course, the means opposing longitudinal movement of the structural member 400 do not have to be positioned directly within the member 400, but can be positioned separate therefrom. FIG. 10 illustrates one such separate positioning, where a spring or the like 700 might be secured to the mounting plate 200, vehicle frame 810 or the like, which would oppose longitudinal movement of the structural arm 400 in a manner similarly discussed in FIGS. 7–9.

As noted above, the longitudinal deflection of the structural arm 400 is accompanied by an initial force absorption due to a means opposing longitudinal movement of the structural arm. Such typical means have been shown, for purposes of illustration, in FIGS. 7–10, and generally comprise a resilient means such as a spring or the like. The magnitude of the force absorption can be varied in a couple of different ways. For example, a stiffer spring would result in a greater force absorption over a given slot length, measured from end 460 to end 470, where the slot length and the spring stiffness can be individually varied to produce a desired amount of longitudinal force absorption.

Figure 11:
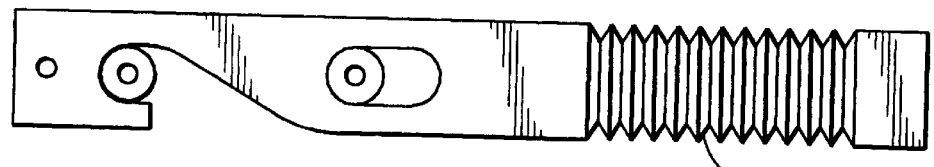

Other means, distinct from those discussed in connection with FIGS. 7–10, to oppose longitudinal movement of the structural arm 400 may be used. For example, the arm itself might be formed of a compressive material, which compression acts to absorb some of the impact force upon a vehicle. The material might be longitudinally compressible along a straight axis, or along a helical axis similar to a helically reinforced catheter or the like. Of course, an arm made from compressible material can also be used in conjunction with a spring means as shown, for example, in FIG. 7. Another means to oppose longitudinal movement of the structural arm 400 shown in FIG. 11 might comprise a structural arm having internal so-called "crumple zones" 740, where the arm would, in effect, crumple prior to its longitudinal deflection.

Returning now to FIG. 6. After the structural arm 400 has undergone a longitudinal deflection as shown in FIG. 6, and has absorbed some of the initial impact force as described in connection with FIGS. 7–11, it will be understood that the support 350 is no longer positioned within the hook shaped slot area 420, i.e. the catching arrangement is no longer operative, and rotation of the structural member 400 about the support rod 360 can now commence. In other words, as long as support rod 350 is situated within the hook shaped slot area 420 and is positioned on the supporting surface 430, the structural arm 400 would be unable to rotate on the support rod 360. This might occur under minor impact conditions, where the longitudinal deflection might not be great enough for the support rod 350 to clear the supporting surface 430, in which case the structural member 400 would return to its original position, see FIG. 2, after the impact force has been dissipated. This is one of the benefits of the device of the present invention over the original Sherno design, which does not have the ability to deflect longitudinally even under minor impact conditions.

Figure 12A:
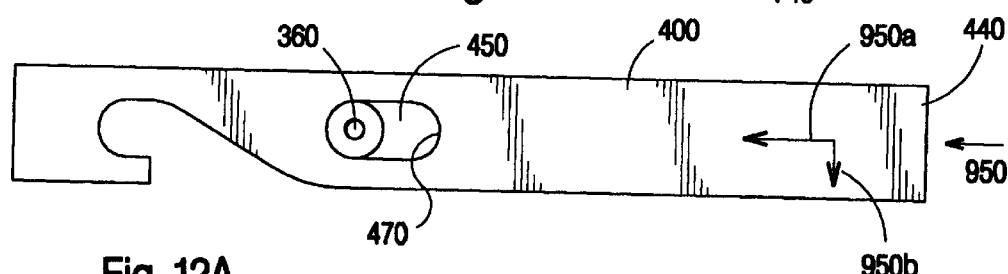
FIG. 12A is a side view of the elongated structural arm of the invention shown for purposes of illustrating impact force components upon the impact end of such member.
Figure 12:
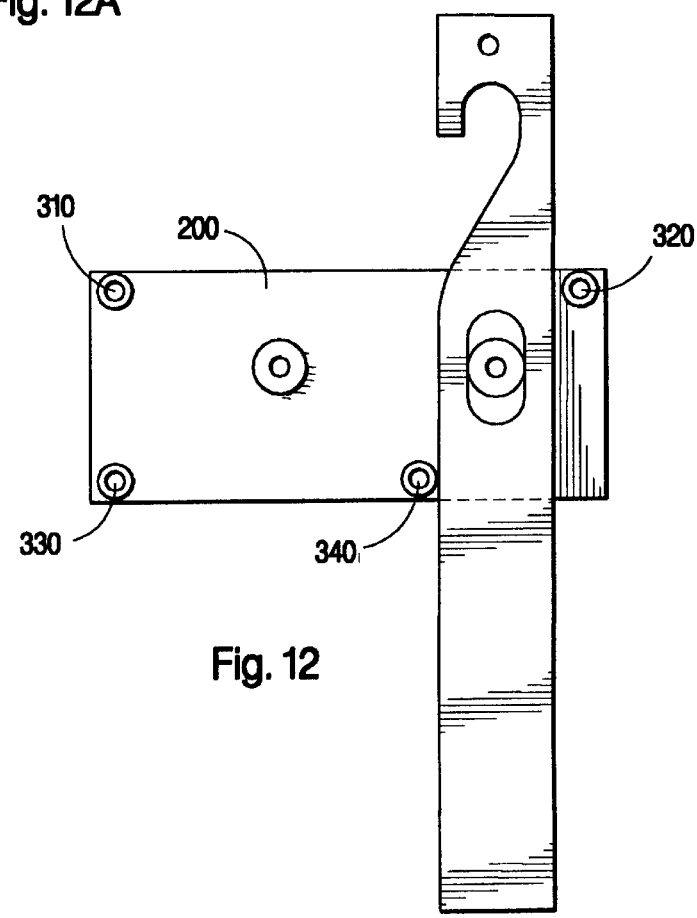
FIG. 12 is a side view of the improved collision impact absorber of the invention shown with the elongated structural member rotated to a substantially vertical position.

As soon as the structural arm 400 becomes "unlocked" so to speak, with the release of the support rod 350 from the hook shaped slot area 420 as a result of the longitudinal deflection of the structural arm 400 under mid-level impact conditions, the structural arm 400 commences a clockwise rotation in accordance with force arrows 960 about the support rod 360, until such rotation is stopped by an outwardly extending attachment means or bolt 340, as shown in FIG. 12, or support rod 370 shown in FIG. 4, if the device is equipped with the plate 600 of FIG. 4. The structural member 400 undergoes a clockwise rotation about the support rod 360 because of its slight downward angle to the horizontal, and placement of the bolt 340, or support rod 370 as the case may be, along the lower surface of the mounting plate will determine the extent of the clockwise rotation of the structural member 400.

Since the impact force 950 is applied to the structural member 400 slightly off center with respect to the pivot or support rod 360, the longitudinal force may be conceived as being broken up into two components, a longitudinal component 950a and a perpendicular component 950b, which is at first small, but rapidly increases as the structural member begins to rotate about the pivot 360 after having travelled longitudinally sufficiently to bring the end 470 of the slot 450 against the pivot rod 360 and the leverage of the arm forces the other end of the structural member upwardly tending to lift the weight of the vehicle as the structural member extends upwardly. These force components are shown in outline in FIG. 12A.

Figure 13:
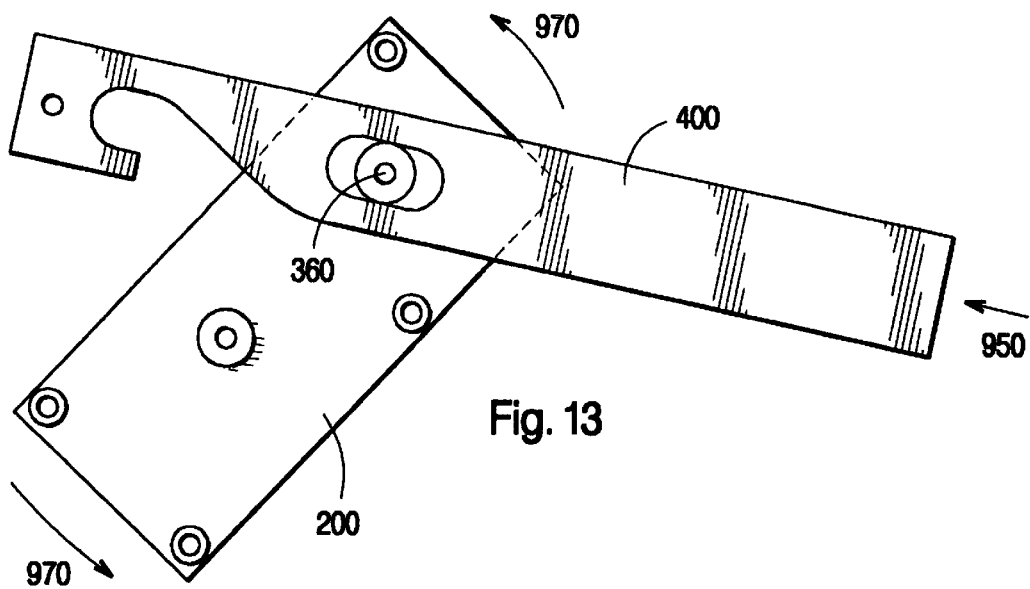
FIG. 13 is a side view of the improved collision impact absorber of the invention shown with the elongated structural member and the vehicle mounting means each rotated slightly with respect to each other.
Figure 14:
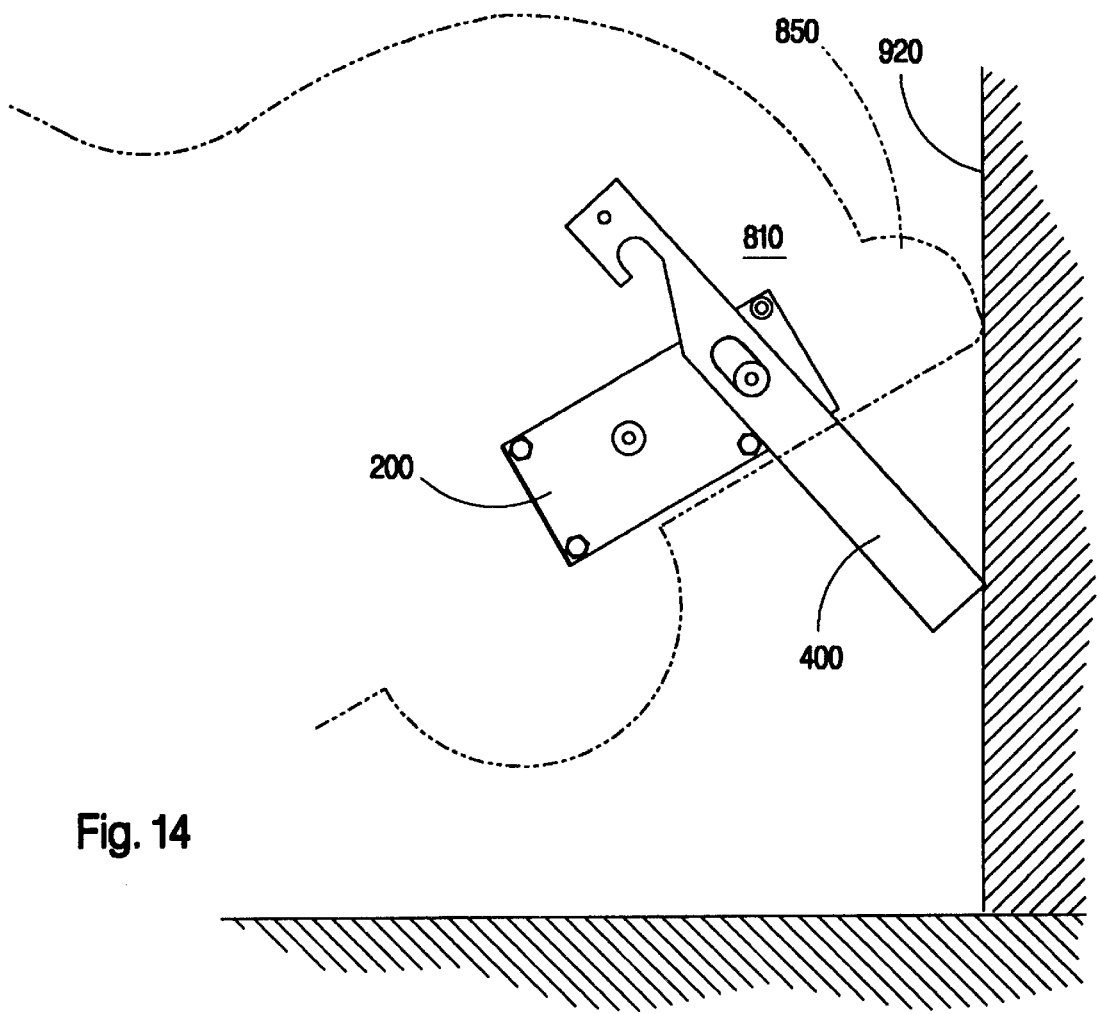
FIG. 14 is a schematic side view of the impacted end of a vehicle shown with the improved collision impact absorber rotated fully about its pivot point and the resultant vehicle being greatly elevated above the planar surface.

What actually occurs in response to an impact force 950 is partially illustrated in FIG. 13, which shows an additional reactive rotation of the mounting plate 200 about the structural member 400 via the support rod 360 in accordance with force arrows 970, which causes the vehicle section to rotate or lift from the ground as further illustrated in a somewhat exaggerated fashion in FIG. 14. In fact, a collision or an impact upon the device of the present invention causes the rotation of both the structural member 400 and the mounting plate 200, or the vehicle 810, via the support rod 360, in opposite directions of course. The structural member 400 is caused to rotate about the support rod 360 in an active fashion, while the mounting plate 200, or the vehicle frame 810, is caused to rotate about the structural member 400 via the support rod 360 in a reactive or coactive fashion.

Figure 15:
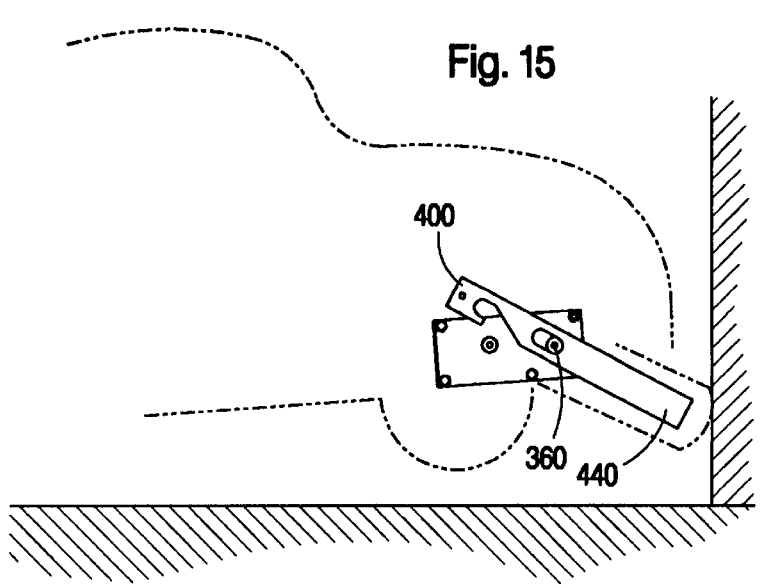
FIG. 15 is a schematic side view of the impacted end of a vehicle shown with the improved collision impact absorber partially rotated about its pivot point and the resultant vehicle being elevated above the planar surface.

Consequently, an impact force upon the structural member 400 causes, through its longitudinal deflection and subsequent rotation about the vehicle frame, a reactive lifting of the vehicle, which lifting absorbs a very large amount of force, far greater than that absorbed through the longitudinal deflection of the structural member 400. The impact force is, of course, absorbed via the resistance or reaction between the impact force and the weight of the vehicle trying to resist being lifted by the rotation of the structural member 400 about the support rod 360. While FIG. 14 illustrates the structural member 400 separated from the bumper assembly after the vehicle has been lifted from its supporting surface, it will also be understood that the structural member 400, and more specifically the impact end 440, may be integrally connected to the bumper assembly 850, in which case the bumper assembly might separate, as shown in FIG. 15, in response to a severe rotation of the structural arm 400 about the support rod 360.

Having the bumper assembly separate from the rest of the vehicle body is not a problem if the bumper is designed to be separable therefrom. A separable bumper would also be a small sacrifice in light of a much greater potential harm arising from a mid-level to severe impact collision. After a vehicle has been returned to the ground subsequent to experiencing an impacting force, the structural member 400 can be returned to its locked position, i.e. with the support rod 350 situated within the hook shaped slot 420 and the support rod 360 situated at the end 460 of the slot 450, by longitudinally deflecting the support arm far enough to align the support rod 350 with the hook shaped slot area 420 and the supporting surface 430 (see FIGS. 2 and 6). This can be done either by the vehicle owner at home or by someone at the shop.

Figure 16:
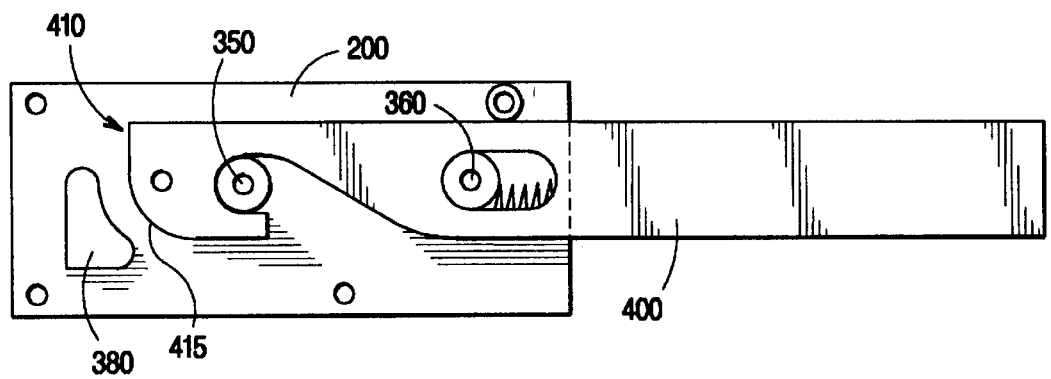
FIG. 16 is a side view of an alternative embodiment of the improved collision impact absorber of the invention at rest along the horizontal with associated cam means positioned opposite the impact end of the elongated structural member.

FIG. 16 is a side view of an alternative embodiment of the device of the present invention, shown with the elongated structural member 400 locked in a horizontal position, as opposed to a slightly angled position as shown in FIGS. 2. et al. A longitudinal deflection of the structural member 400 causes the lower surface 415 of the end 410 of the structural member 400 to impact against a cam means, in the form of a deflection member 380 secured to the mounting plate 200. The impacting of the structural member 400 against the cam means 380 causes the end of the structural member 410 to rotate in a clockwise direction about the support rod 360. In FIGS. 2 et al., the initial positioning of the structural member 400 at a slight angle to the horizontal caused an immediate clockwise rotation of the structural member 400 about the support rod 360 once the support rod 350 was cleared of the hook shaped slot area 420. In FIG. 16, since the structural member 400 is not initially positioned at an angle to the horizontal, but is instead positioned along the horizontal, means are necessary to initiate a rotation of such structural member 400 in order to create a force-absorbing lifting of the vehicle, and such means here are provided by cam means 380. An extended longitudinal deflection of the structural member 400 causes the curved surface 415 to ramp against the deflection member 380, which in turn initiates a rotation of the structural member 400 about the support rod 360. Having the structural member 400 situated generally horizontally at rest is preferable if the structural member is going to be integrated into the bumper assembly. As soon as the cam begins to bias the structural member into a slightly inclined orientation, the force components illustrated in FIG. 12A come into effect and the structural member rotates toward a steeply inclined position tending to lift the vehicle and thereby dissipating the force against gravity.

Figure 17:
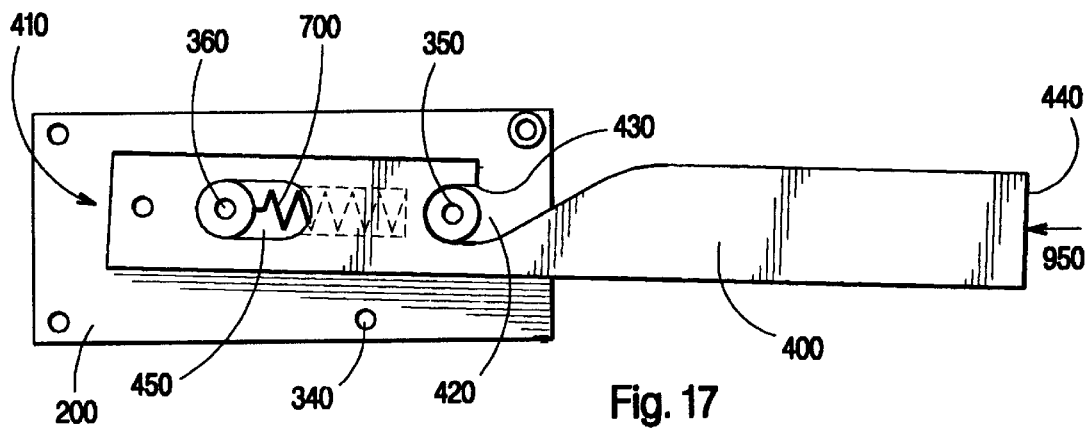
FIG. 17 is a side view of an alternative embodiment of the improved collision impact absorber of the invention at rest at an angle to the horizontal with the pivot point positioned opposite the impact end of the elongated structural member as compared with FIG. 2 which shows the pivot point nearer to the impact end.
Figure 18:
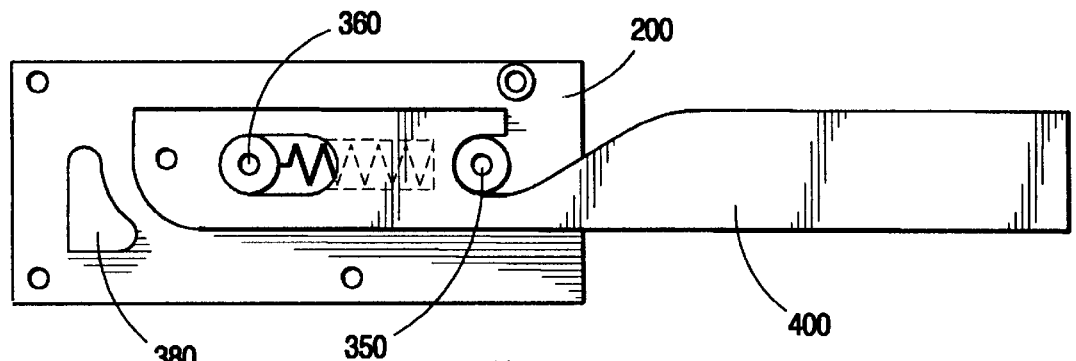
FIG. 18 is a side view of an alternative embodiment of the improved collision impact absorber of the invention of FIG. 17 at rest along the horizontal.

FIG. 17 is a side view of an alternative embodiment of the device of the present invention, showing an alternative, somewhat opposite arrangement of the support rods 350 and 360. In FIG. 17, the slot 450 and support rod 360 is farther away from the impact end 440 of the structural member than the hook shaped slot area 420 and support rod 350, which is now shown in FIG. 17 inverted, i.e. with the hook shaped slot facing upwards, as compared with FIGS. 2 et al., such that the pivot point of the structural member 400 is now at the end 410 of the structural member 400 as opposed to near the middle as shown in FIGS. 2 et al. Resilient, opposing means 700 are also shown extending between the support rod 360 and the hook shaped slot area 420, although it will be understood than any longitudinal opposing means may be used, including those discussed in connection with FIGS. 7–11. An impact force 950 upon the impact end 440 of the structural member 400 causes the structural member 400 to longitudinally deflect as before, and once the support rod 350 is cleared from the hook shaped slot area 420 and the supporting surface 430, the structural member 400 is free to rotate in a clockwise direction about the support rod 360 towards the vertical, until such rotation is prevented by bolt 340, as before. Of course, while FIG. 17 shows the alternative embodiment of the structural member 400 mounted at an angle to the horizontal, it could also be mounted along the horizontal as shown in FIG. 18.

Figure 19:
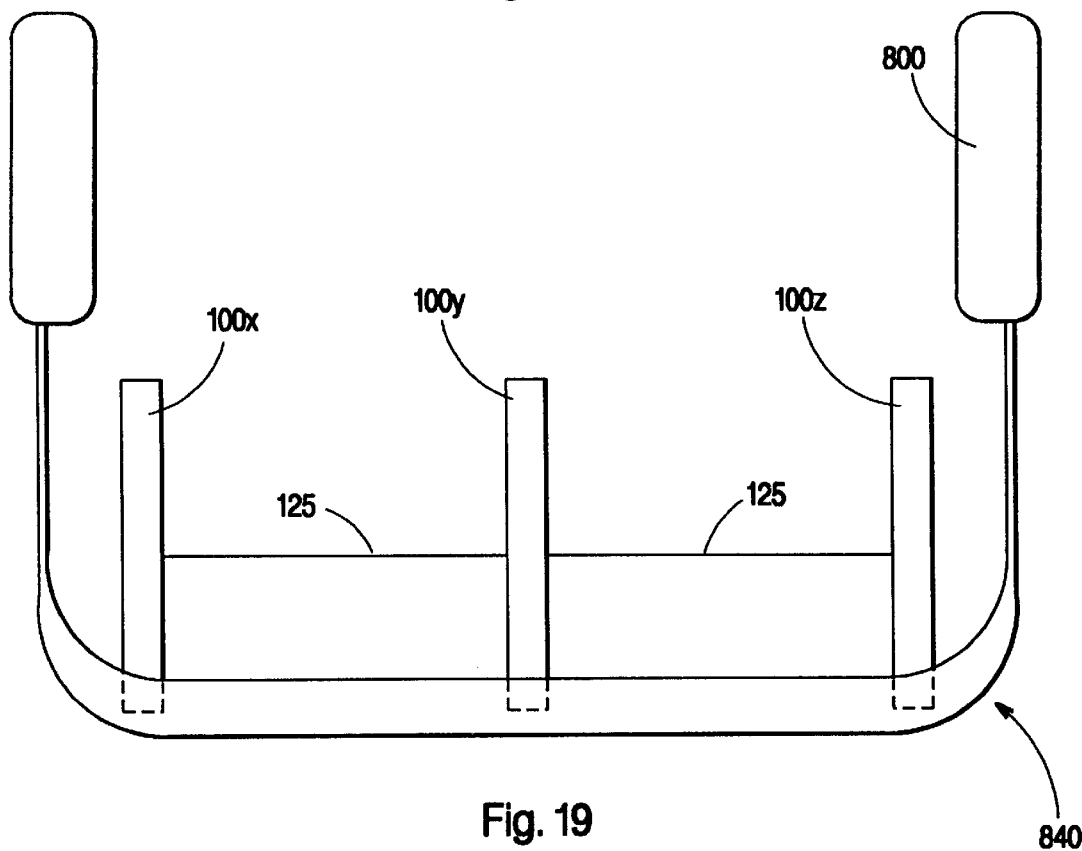
FIG. 19 is a top diagrammatic view of a vehicle having three improved collision impact absorbers positioned along the impact end of a vehicle and connected by a joinder means.

Implementation of the device of the present invention can occur in a number of ways. FIG. 19 is a top, diagrammatic view of a partial vehicle layout having three collision impact absorbers 100x, 100y and 100z mounted to the front end 840 of a vehicle 800. Therefore, an impact along any part of the front end 840 would effect at least one of the impact absorbers 100x, 100y, and/or 100z. Of course, more impact dissipators may be used than are shown in FIG. 19, or less may be used if desired. To further stabilize and coordinate the actions of several impact dissipators used in parallel, a connecting member or members 125 could be positioned between such dissipators to harmonize the movements of each with respect to each other. In other words, a direct impact against impact dissipator 100x, for example, would be communicated via the connection members 125 to the other impact dissipators 100y and 100z, so that the entire vehicle would be lifted, not just the corner by dissipator 100x. This force communication would also increase the force dissipative feature of the device of the present invention, because a localized force impact would be distributed across the entire end of the vehicle.

While the device of the present invention is shown primarily mounted to a vehicle, it will be understood that it could also function as a retrofit, where unequipped vehicles could be fitted with an improved impact absorber, or a series of absorbers, as long as mounting access to the vehicle frame is possible.

The impact dissipator of the invention can, as it will have become evident from the foregoing description, be embodied in various forms wherein the basic mechanism supplies an elongated structural member having a longitudinal range of movement with respect to the vehicle, such longitudinal movement being resiliently resisted by spring or other resilient means and having a catch or latch means adapted to hold the structural member at a uniform angle with respect to the vehicle with respect to at least a portion of the longitudinal movement of the member, but to be released in the other portion, and usually a rather restricted portion of the longitudinal movement of the structural member, when the latch is released, the structural member being free to pivot about a pivot on the frame of the vehicle.

Figure 20:
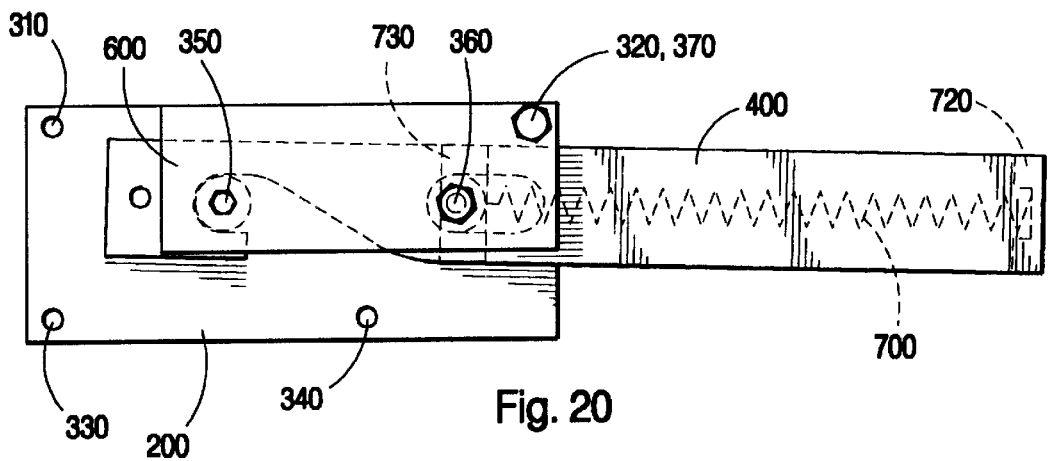
FIG. 20 is a side view of the preferred embodiment of the improved collision impact absorber of the present invention.

The longitudinal movement of the structural member with respect to the vehicle may be implemented in several different manners, for example, through the use in the member of a slot in which a pivot rod or the like may slide basically as shown in the attached figures as preferred arrangements, and particularly in FIGS. 4 and 9 as preferred arrangements, shown in FIG. 20 in composite form. FIG. 20, which is a side view of the combination of the embodiments shown previously in FIGS. 4 and 9, is the Applicant's presently preferred embodiment because the plate 600 tends to reinforce and stabilize the elongated structural member 400 between such plate 600 and the mounting means 200, and because the internal plugs 720 and 730 maintain the generally central alignment of the resilient opposing means 700 within the structural member 400. The plate 600, as previously mentioned in connection with FIG. 4, is further anchored to the mounting means 200 through the support rods 350, 360 and 370, which together tend to strengthen the arrangement as whole, and with respect to the vehicle upon which the arrangement is mounted.

However, other alternative arrangements may also be implemented. For example, the structural arm could be arranged to slide within a surrounding sleeve or saddle, which sleeve or saddle is itself pivoted upon the vehicle and arranged to permit only limited longitudinal movement of the structural member with respect to it. The structural member could also be formed as a telescoping member resistant to telescoping through the agency of either internal or external resilient means. In other words, an internal spring could resist telescoping of the member or an external spring or springs mounted between external mounts could resist telescoping. Such telescoping could be mounted for pivoted movement at one end upon the frame of the vehicle, in which case only a portion of the structural member would be longitudinally moveable with respect to the vehicle, but the entire member would be pivotable. Latch means to prevent immediate rotation of the impact absorber may comprise simple notched hooks integrated as shown with the longitudinal structural member. They may also, however, take the form of external latch means arranged to interengage with external catches within certain ranges of movement. The impact absorber might also conceivably be fabricated from several lateral plates connected together into a modified box frame pivoted to the frame of a vehicle and having an elongated rod or the like arranged for limited longitudinal movement against a spring resistance through the pivoted frame. In such case also, if the entire structure is conceived as the longitudinal structural member, only a portion of such longitudinal structural member will be longitudinally movable, although the entire member will be pivotable. Thus it will be seen that the device of the invention may be arranged and constructed in various manners, so long as it continues to function in the manner herein described and as broadly claimed. It should be understood, however, that Applicant has described and shown herein his presently preferred embodiment of the invention which is particularly shown in FIGS. 4 and 9, alone or in combination as FIG. 20.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. An impact dissipator for mounting between the frame and an external surface of a vehicle comprising:
   (a) a mounting means adapted for attachment to a vehicular frame,
   (b) an elongated structural member pivoted upon the mounting means and adapted to be temporarily secured against pivoting at a position spaced from the pivot point of the structural member, such elongated structural member having an impact end adapted for positioning near the external surface of the vehicle and an end opposite such impact end adapted for positioning away from the external surface of the vehicle,
   (c) at least a portion of said elongated structural member being longitudinally movable with respect to the mounting means within a limited range of longitudinal movement,
   (d) retention means arranged and constructed to prevent the elongated structural member from pivoting with respect to the frame of the vehicle within a portion of the longitudinal range of movement of the structural member portion and being inoperative within a further range of longitudinal movement of said portion of the elongated structural member from preventing pivoting thereof about its pivot point with the mounting means, and
   (e) means to urge the elongated structural member upon receiving an external impact to pivot toward a substantially vertical orientation with its pivot point disposed upwardly from the impact end of the member.

2. An impact dissipator in accordance with claim 1 wherein the retention means comprises a slide-type latch.

3. An impact dissipator in accordance with claim 2 wherein the limited longitudinal range of movement of the elongated structural member is provided by a slot aligned with the elongation of the structural member surrounding a pivot rod attached to the mounting means.

4. An impact dissipator in accordance with claim 3 wherein the slide-type latch is formed by a hook shaped slot open at one end in a side of the elongated structural member which during initial operation is hooked over a support rod.

5. An impact dissipator in accordance with claim 4 wherein the pivot point of the elongated structural member is situated farther away from the impact end of the member than the hook shaped slot.

6. An impact dissipator in accordance with claim 4 wherein the pivot point of the elongated structural member is situated closer to the impact end of the member than the hook shaped slot.

7. An impact dissipator in accordance with claim 2 wherein the means to urge the elongated structural member to pivot toward a vertical orientation comprises an arrangement wherein the impact end of the member is at least somewhat lower than the opposite end of such member.

8. An impact dissipator in accordance with claim 2 wherein the means to urge the elongated structural member to pivot upon external impact with the impact end is a cam means arranged to be contacted during longitudinal movement of the elongated structural member beyond the range of interlocking with the slide-type catch means and to bias the elongated structural member toward a vertical orientation.

9. An impact dissipator in accordance with claim 7 including resilient means opposing longitudinal movement of the elongated structural member upon external impact.

10. An impact dissipator in accordance with claim 8 including resilient means opposing longitudinal movement of the elongated structural member upon external impact.

11. An impact dissipator in accordance with claim 10 wherein the resilient means is a spring means.

12. An impact dissipator in accordance with claim 11 wherein the resilient means is positioned within the elongated structural member.

13. An impact dissipator in accordance with claim 11 wherein the resilient means is not positioned within the elongated structural member.

14. A vehicle having at least one impact absorber for mounting between the frame and the bumper of such vehicle, such impact absorber comprising:
   (a) a mounting means adapted for attachment of the at least one impact absorber to the vehicular frame,
   (b) an elongated structural member pivoted upon the mounting means, such member having an impact end adapted to be secured adjacent the vehicle bumper and an opposite end positioned opposite such impact end, (c) the elongated structural member being longitudinally movable with respect to the mounting means within a limited range of longitudinal movement, (d) means to temporarily maintain such elongated structural member at a fixed position with respect to the frame through slidable engagement with a first support rod fixed to the mounting means, (e) means to enable a predetermined longitudinal movement of the elongated structural member under the influence of an external impact for longitudinal deflection of the elongated structural member upon an initial external impact, and (f) means to commence a predetermined rotation of the elongated structural member with respect to the mounting means subsequent to the initial longitudinal deflection of such member, such that the rotation of the elongated structural member causes the vehicle to elevate with respect to the ground.

15. A vehicle in accordance with claim 14 wherein the means to enable a predetermined longitudinal movement of the elongated structural member comprises a slot in which is positioned a second support rod integrally connected to the mounting means, such second support member being slidably movable within such slot.

16. A vehicle in accordance with claim 15 wherein the means to temporarily maintain such elongated structural member at a fixed position with respect to the frame comprises a hook-shaped slot for engagement with the first support rod.

17. A vehicle in accordance with claim 14 further comprising resilient means opposing or resisting longitudinal movement of the elongated structural member.

18. A vehicle in accordance with claim 17 wherein such resilient opposing means is a spring means.

19. A vehicle in accordance with claim 14 wherein the vehicle has a plurality of impact absorbers.

20. A vehicle in accordance with claim 19 wherein the plurality of impact absorbers are connected by a connecting member so as to act in parallel under the influence of an external impact.

* * * * *